(12) United States Patent
MacLellan et al.

(10) Patent No.: US 8,576,234 B2
(45) Date of Patent: Nov. 5, 2013

(54) SIMULATING ANIMATION DURING SLIDESHOW

(75) Inventors: Scot MacLellan, Rome (IT); Ivan Orlandi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 12/896,271

(22) Filed: Oct. 1, 2010

(65) Prior Publication Data

US 2012/0081404 A1    Apr. 5, 2012

(51) Int. Cl.
*G06T 13/00*    (2011.01)

(52) U.S. Cl.
USPC .................. 345/473; 345/419; 345/420

(58) Field of Classification Search
None
See application file for complete search history.

(56) References Cited

U.S. PATENT DOCUMENTS

| | | | | |
|---|---|---|---|---|
| 5,880,743 | A  * | 3/1999  | Moran et al. | 345/473 |
| 6,404,433 | B1 * | 6/2002  | Ruff et al.  | 345/441 |
| 8,352,397 | B2 * | 1/2013  | Rubin et al. | 706/45  |
| 8,409,000 | B1 * | 4/2013  | Colaco et al.| 463/31  |
| 2003/0146915 | A1 * | 8/2003 | Brook et al. | 345/473 |
| 2005/0041872 | A1 * | 2/2005 | Yim et al.   | 382/232 |

OTHER PUBLICATIONS

"Ken Burns Effect" Wickipedia, the free encyclopedia, http://en.wikipedia.org/wiki/Ken_Burns_Effect, Sep. 8, 2010. Wikimedia Foundation, Inc., a non-profit organization, pp. 1-4.
"Troubleshooting (ActionScript 2 component) >> combine the Ken Burns Effect and mx.transitions"http://forums.slideshowpro.net, May 2007, pp. 1-7.

* cited by examiner

*Primary Examiner* — Said Broome
(74) *Attorney, Agent, or Firm* — Garg Law Firm, PLLC; Rakesh Garg; Libby Z. Toub

(57) ABSTRACT

A method and system for simulating an animation effect during the display of a digitally encoded picture, including the steps of: storing a plurality of predetermined animation effects; identifying at least one selected portion of the picture by means of a main subject identification algorithm; selecting at least one of the predetermined animation effects; modifying the display of the picture according to the selected at least one predetermined animation effect, so that the at least one selected portion of the picture is emphasized.

18 Claims, 5 Drawing Sheets

SIMULATING ANIMATION DURING SLIDESHOW

TECHNICAL FIELD

The present invention relates to the field of image processing and more particularly to simulating the animation during a slideshow.

BACKGROUND OF INVENTION

Displaying a sequence of still images is used for many purposes, like performing a slideshow, viewing a collection of photographs or to have something interesting to look at when a computer is locked (screensaver). A sequence of static images however does not always capture the attention of the viewer. To combat this and to make a sequence of still images more attractive, techniques such as zooming in or out and scrolling from one part of the image to another are often used to give the impression of motion. One of the prior art techniques was made famous by Ken Burns, and it is often referred to as the Ken Burns Effect. The Ken Burns Effect is well known among those skilled in the art (see e.g. description on Wikipedia). It is a technique of embedding still photographs in motion pictures, displayed with slow zooming and panning effects, and fading transitions between them. It can be used to give the impression of animation to still pictures by e.g. slowly zooming in on subjects of interest and then moving from one subject to another. For example, in a photograph with several persons, the focus might slowly pan across the faces and come to rest on one person. With focus it is intended that the center (or an emphasized part) of the image is displayed.

The Ken Burns effect can be used as a transition between clips as well. For example, to segue from one person in the story to another, an operator might open a clip with a close-up of one person in a photo, then zoom out so that another person in the photo becomes visible. This is especially practicable when covering older subjects where there is little or no available film. The zooming and panning across photographs gives the feeling of motion, and keeps the viewer visually entertained. This technique has become a staple of documentaries, slide shows, presentations, and even screen savers. Existing editing systems, some of which also use this effect for screensavers, often include the Ken Burns Effect or transition, with which a still image may be incorporated into a film using this kind of slow pan and zoom. Some picture slideshow systems or photo editing programs present such an option labelled "Ken Burns Effect".

The Ken Burns effect is customizable and can be applied together with other effects using code like the one described in the following page: http://forums.slideshowpro.net/viewtopic.php?pid=29056

The Ken Burns effect works very well when applied manually to each image, but all current attempts to apply the effect automatically (like in iPhoto screenshows) are less effective as the program that applies the technique does not know what is the subject of the image, and cannot therefore apply the most appropriate effect. Often the result can be unpleasant, as it excludes all or part of the interesting portions of the image. To combat this, some programs minimize the impact of the animation, by ensuring that very little of the area of the image is ever excluded from the view, but this reduces the positive effects.

It is an object of the present invention to provide a technique which alleviates the above drawback of the prior art.

SUMMARY OF THE INVENTION

A method, system, and computer program for simulating an animation effect during the display of a digitally encoded picture are provided.

A set of predetermined animation effects is accessed. A first selected portion of the picture is identified with a computer implemented main subject identification algorithm. The image display is centered on the first selected portion of the picture. A predetermined animation effect is selected and applied to the picture.

BRIEF DESCRIPTION OF THE DRAWINGS

Embodiments of the invention will now be described, by way of example only, by reference to the accompanying drawings, in which.

DESCRIPTION OF A PREFERRED EMBODIMENT

Figure 1:
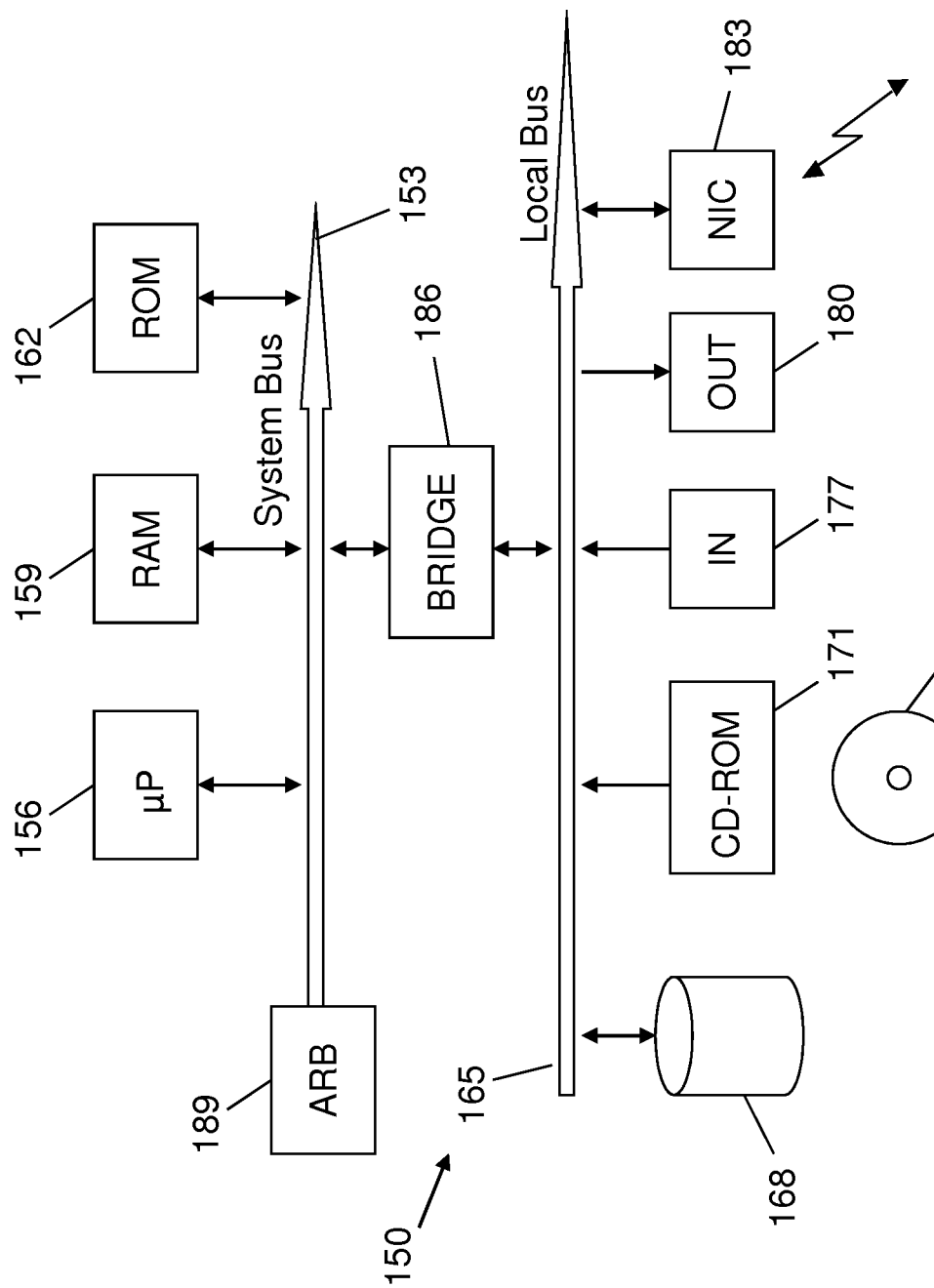
FIG. 1 is a block diagram of a generic computer system adapted to perform the method of a preferred embodiment of the present invention.

As shown in FIG. 1, a generic computer of the system (e.g. computer, Internet server, router, remote servers) is denoted with 150. The computer 150 includes several units that are connected in parallel to system bus 153. In detail, one or more microprocessors 156 control the operation of computer 150; RAM 159 is used as a working memory by microprocessors 156, and ROM 162 stores basic code for a bootstrap of computer 150. Peripheral units are clustered around local bus 165 (using respective interfaces). Particularly, a mass memory consists of hard-disk 168 and drive 171 for reading CD-ROMs 174. Moreover, computer 150 includes input devices 177 (for example, a keyboard and a mouse), and output devices 180 (for example, a monitor and a printer). Network Interface Card 183 is used to connect computer 150 to the network. Bridge unit 186 interfaces system bus 153 with local bus 165. Each microprocessor 156 and bridge unit 186 can operate as master agents requesting an access to system bus 153 for transmitting information. Arbiter 189 manages the granting of the access with mutual exclusion to system bus 153. Similar considerations apply if the system has a different topology, or it is based on other networks. Alternatively, the computers can have a different structure, include equivalent units, or consist of other data processing entities (such as PDAs, mobile phones, and the like).

A preferred embodiment of the present invention exploits the so called Main Subject Identification algorithm, which is known in the art. Examples of prior art documents which disclose such algorithm are the following:

Luo, J. [Jiebo], Singhal, A.[Amit], Etz, S. P. [Stephen P.], Gray, R. T. [Robert T.], A computational approach to determination of main subject regions in photographic images. This is an example description of Main Subject Identification.

U.S. Pat. No. 7,212,668: according to the method of this patent, an image is segmented into regions and various features of the regions are extracted and used to calculate a confidence factor that a particular region is a main subject. This is another example of the known Main Subject Identification technique.

In a preferred embodiment of the present invention this technique is combined with the Ken Burns effect giving the impression of the animation in an automatic way.

In a preferred embodiment of the present invention, in order to identify the subject of an image (e.g. the one represented in FIG. 2a), a grid is overlaid on the image and the amount of information in each square is measured. Of course the finer the grid the more precise will be the result. In a preferred embodiment of the present invention this selection of dense sectors (i.e. groups of neighbouring squares having similar density, and therefore being candidate to represent an object) could be done in the following way: a square is selected and is assigned an object ID and a density value; any surrounding square with a similar density value (i.e. having a density value within a predetermined range centered on the first square value) is assigned the same object ID and this operation is recursively repeated until an object is identified which is completely surrounded by squares with different density value (or by the border of the overall image).

The process is repeated for any unassigned square. In this way, 'busy' sectors and 'empty' sectors can be identified. Not all of the identified sectors or objects will be selected as "main subjects", but normally only the largest one. Also a large object could represent a background, e.g. 'empty' sectors around the edges of an image may represent the sky, the sea, or a lawn which is background to the main subject, which may be represented by a cluster of busy sectors in the centre of the image, representing e.g. a person, a boat, or an animal.

In a preferred embodiment of the present invention, large sectors with similar density, which are placed at the border of the image will be filtered out, because it is assumed that main subject (or the plurality of main subjects) will not be around the borders. A simple way of filtering these border large sectors (e.g. a sky or a sea) is to check if an image has a large number of squares along the border of the image: when the percentage of border squares in a selected object is higher than a predetermined thresholds, than it can be assumed that the object is not a candidate main subject.

Figure 2A:
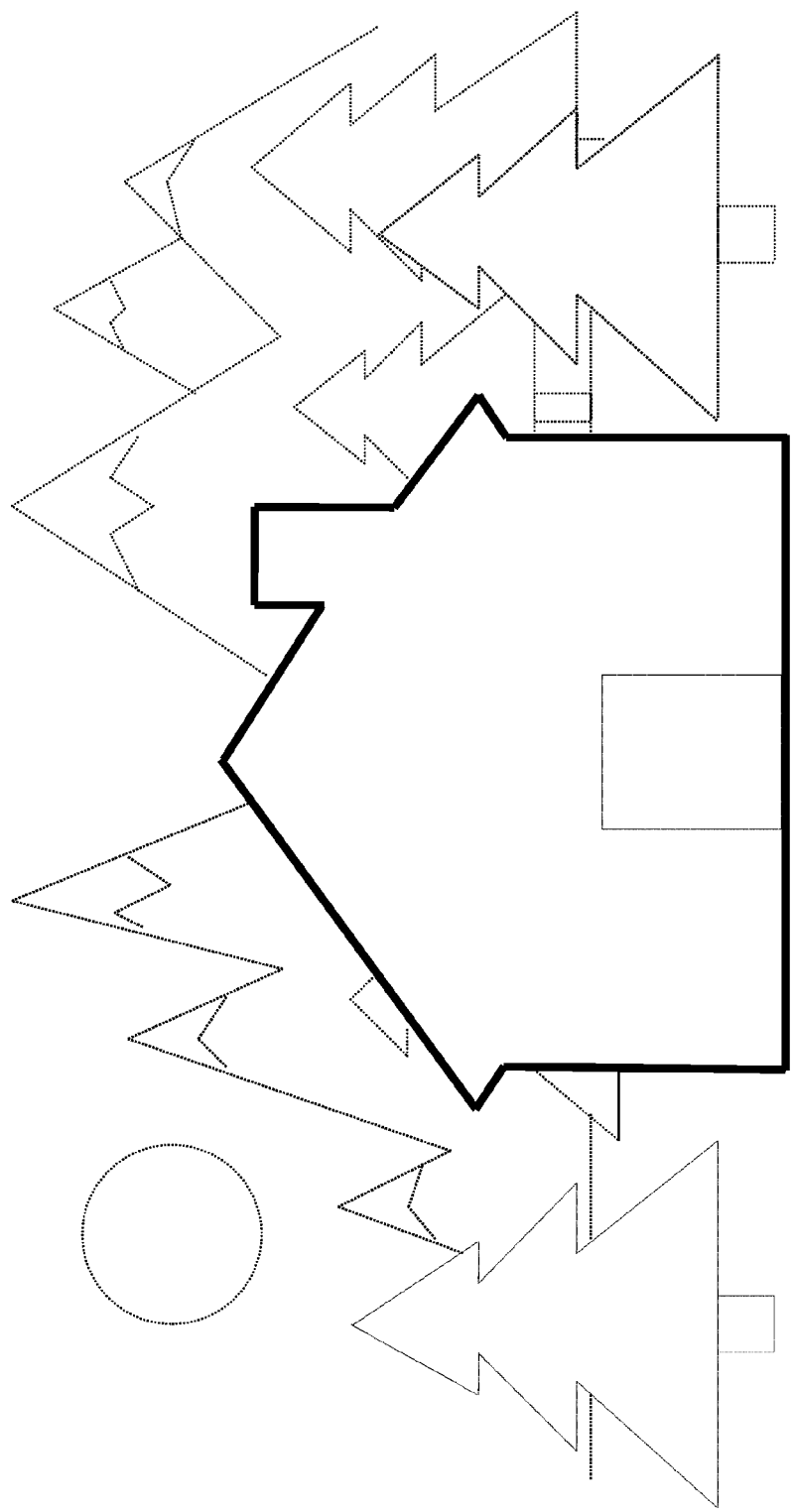
FIG. 2a shows an example of an image with a clearly identifiable Main Subject.
Figure 2B:
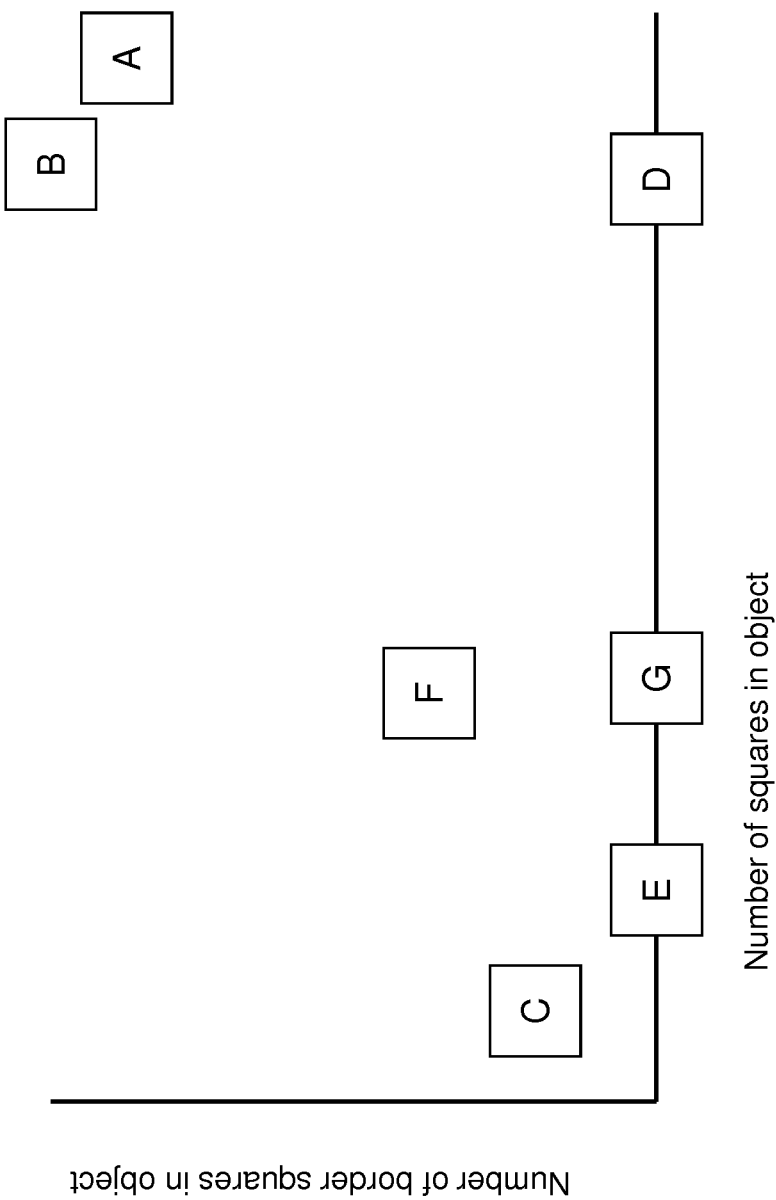
FIG. 2b shows an example graph representing portions of an image according to their proximity to the border.

FIG. 2b represents a graph where the identified objects are displayed according to their size and their percentage of border squares. Objects A and B represent large portions of the image, but close to the border. Object D represents an object in the middle of the overall image (i.e. not on the border) and it will be the best candidate to be main subject of the image.

As mentioned above, the main subject can be identified in an area of high information density with respect to the background which is relatively empty. Of course, the opposite may also be true, where the subject of the photo may be represented by areas of low information density and the background relatively dense with information. A dull fish in front of a brightly-coloured coral reef, may be an example of such a case. In both cases however, the subject has been identified by being a cluster of similar sectors that contrasts with the rest of the image (and in particular with the sectors around the outside of the image).

In the example shown on FIG. 2a, a main subject is clearly identifiable with the house in the centre of the picture. Here we would easily identify the main subject, and the animation would ensure that this portion of the picture is included in the image being displayed.

Figure 2C:
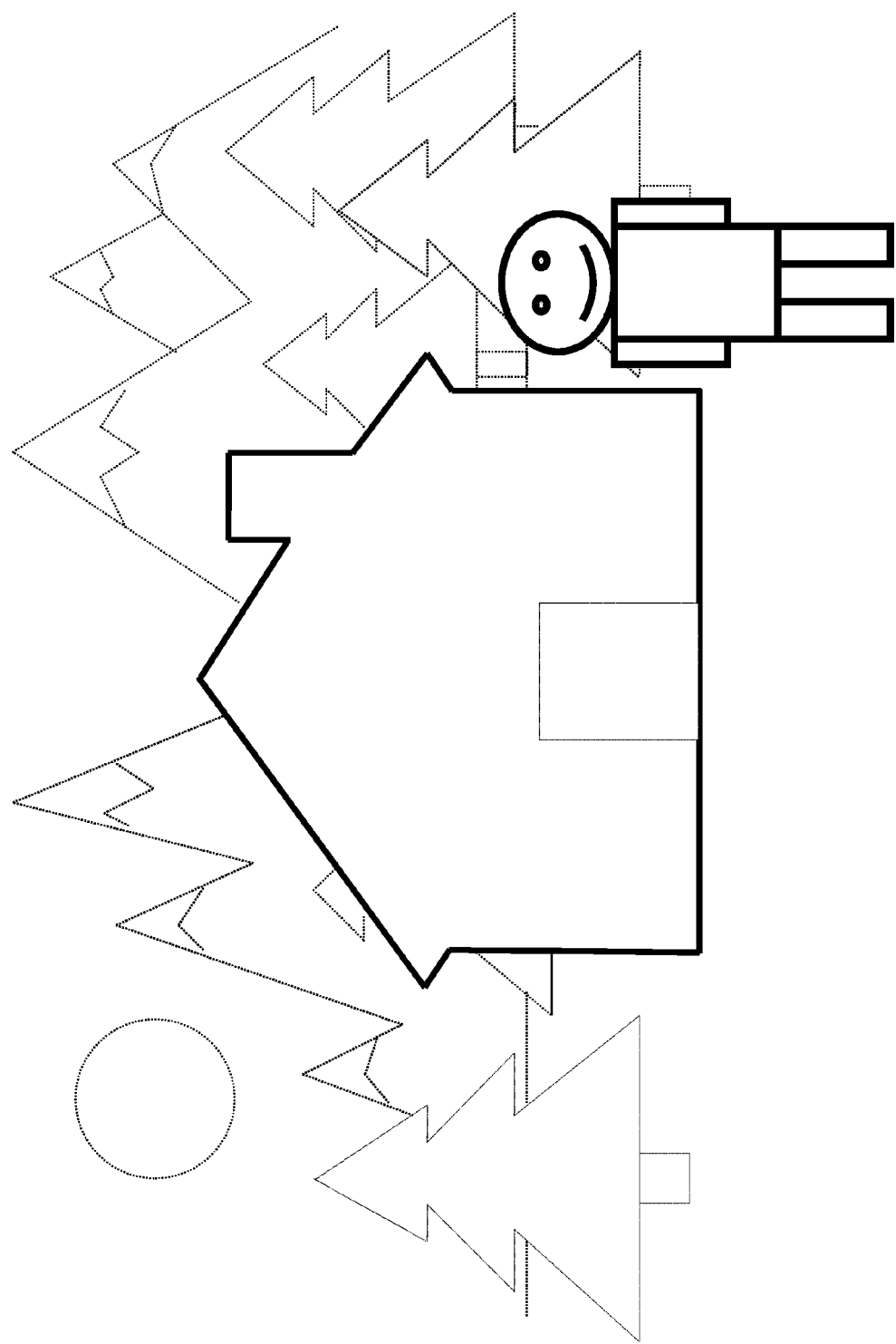
FIG. 2c shows an example of an image with two possible Main Subjects.

Alternatively, there might be more than one main subject which can be identified (see example in FIG. 2c). In this case, the animation would either begin with a zoomed image that includes both subjects, and would zoom out slowly to include the full image, or it would begin with the full image and zoom in to include only one of them. The zoom-in/zoom-out choice may alternate during the course of the slideshow, or may be applied randomly. Other images present a more difficult problem of identification of the main subject. An example could be a group of people that occupies the entire image (school photo or regimental photo) which would be represented by an entire grid of similarly-busy sectors, and there is no single main subject.

In such a case the system would conclude that all of the images are equally important, and would either scroll slowly across the image or would zoom very slightly in order to exclude very little of the image at any point. Other examples include many potential main subjects, in which a defensive animation would be applied (very slight zoom or scroll, in order to exclude little). Similarly, two potential subjects at two extremities of the image would result in a very slight animation.

Always applying the same approach, as in the prior art, yields unsatisfactory results, i.e. little benefit from an always defensive approach, or annoying errors from an always aggressive approach. The combination according to an embodiment of the invention of defensive animation where the main subject is not clear (such as landscapes) and more aggressive animation where the subject is clear (portrait) provides the advantage of a solution which is tailored to the characteristics of the picture.

According to a preferred embodiment of the present invention, after the main subject identification algorithm has been applied, a picture can fall into one of the following categories: an image with a single main subject, an image with more than one main subjects, or an image with no real main subject. According to which of the above categories better describes the picture, the method according to a preferred embodiment of the present invention provides an appropriate animation effect by selecting the animation effect from a set of predetermined effects for that category. Single subject animation effect will include e.g. zoom-in or zoom-out (the Ken Burns effect), pan left and pan right with subject. When a number of main subjects are identified (as mentioned above, this can be dependent on the thresholds imposed on the system) possible solutions are e.g.: moving from one subject to another and then applying the same effects as the single subject case; or alternatively a common area including all main subjects could be selected (in other words the minimum subset of the image in which all identified main subjects are included) and then handled as a single main subject with the same effects.

Finally if no main subject is found (again this can depend on the imposed thresholds and other parameters) the animation effect can be a zooming-in and out and moving around the picture. Other adjustments are possible, e.g. assigning an additional parameter to the animation effect which depends on the relative size of the identified main subject (or group of subjects) compared to the overall image. Just as an example we could set an "amplitude" parameter at High, if the main subject is less than 10% of the whole image, an "amplitude" parameter at Medium when the main subject is between 10% and 50% of the whole image and High when it is more than 50%. With "amplitude" the maximum zoom percentage applied to an image: e.g. in the present example we could say that the parameter High corresponds to zooming an image at 400%, while 25% is Low. This is an example, of course other effects, parameters and thresholds could be created and customized.

The subject identification may result from an automatic process but may also result from previously performed authoring steps.

One or a plurality of predefined marks may be previously associated with an image (as embedded metadata or as files attached or associated with the considered image). The discussed predefined marks may define areas of interest, for which the described animation effect may be applied. For example, such predefined marks may be defined during authoring times. As another example, the predefined masks may also be indicated upon user selection, in real-time.

Among automatic methods for subject identification, face recognition algorithms may be leveraged. Today, such algorithms are fast and efficient. Face detection algorithms are widely available; these algorithms detect the presence of human faces in a picture, as shown in the example of FIG. 2c. They should be carefully distinguished from face recognition algorithms which try to associate identity data to a detected face.

Image recognition techniques perform badly to date, but these algorithms may also be leveraged by the present method (with a step of filtering by identity of people to simulate an animation). According to alternative embodiments of the present invention, one or more human faces may be detected in the content of the image and the simulation of the animation is performed on the detected faces, successively, randomly or selectively.

Pattern recognition algorithms—yet at an earlier stage of development—may also be leveraged. According to other embodiments, one or more predetermined patterns may be detected and the method according to an embodiment is applied to such detected pattern. Examples of patterns may be images of: the sun, a tree, a flower, a car, a wheel, a box, etc. Objects in the foreground or presenting specific color characteristics are more likely to be the objects of interest to the embodiments of the present invention. The considered patterns of reference may be stored in a local or remote database.

Figure 3:
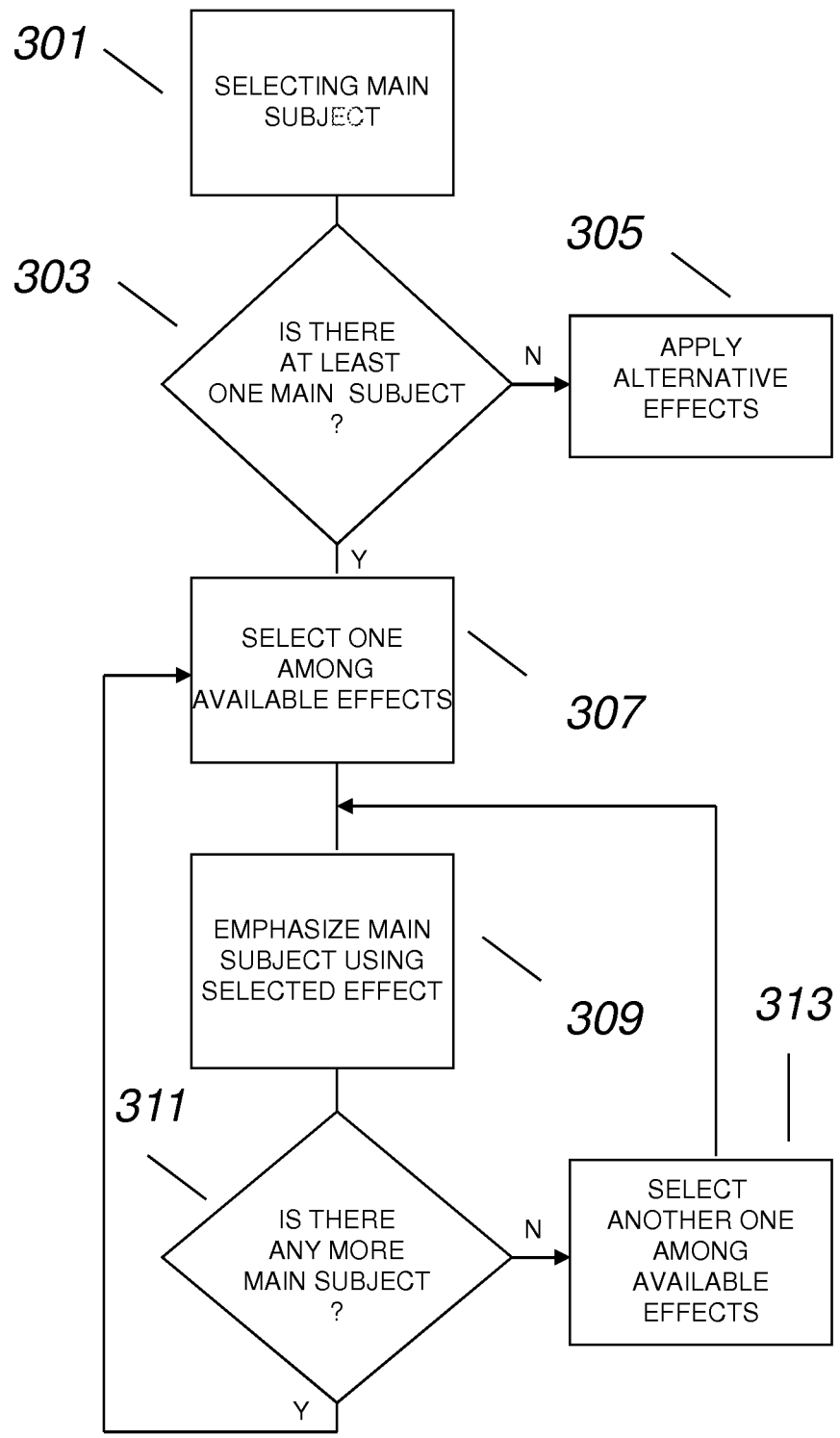
FIG. 3 shows a flowchart representing the steps to perform a method according to a preferred embodiment of the present invention.

FIG. 3 schematically shows the method steps according to a preferred embodiment of the present invention. The process starts at step 301 where a main subject is identified (if possible) as described above. If the algorithm determines (step 303) that no portion of the picture can be considered a "main subject", then the control goes to step 305 where alternative motion effects are implemented as described above. Those skilled in the art will appreciate that the user can customize the algorithm by setting different parameters, e.g. predetermined thresholds which should be considered to determine whether a "main subject" is available or not. If a main subject is found, then one of the predetermined effects available in the system is selected (step 307) and applied at step 309 to emphasize, e.g. zooming-in on the selected main subject. In general the selected main subject becomes the center of the displayed image or, in other words, the focus is directed to the selected main subject.

The duration and the speed of the motion effect again can be easily varied and customized according to the user needs. Whenever, according to its setting, the system determines that it is time to change, another main subject if available (see step 311) is selected and the control goes back to step 307 where a new motion effect (or even the same one as before) is selected. If no more main subjects are available, the method goes to step 313 where a different effect is selected among those available within the system and the control goes back to step 309 where a new effect is applied to the same main subject.

The method of the present invention can help to solve the problem of the prior art by providing an automation application of the Ken Burns Effect (or another effect which emphasizes/de-emphasizes a portion of an image) that produces a result that is close to the optimal result obtained by a manual application. The method according to a preferred embodiment of the present invention identifies the main subject of an image, and then applies an animation effect selected from a predetermined set of effects to highlight the subject. The subject of the image is identified e.g. by using a digital filter which measures the quantity of information in various sectors of the image, and the subject is derived from the overall pattern across the image. Once the subject is identified, the effect to be used can be chosen from a list according to subject type and position.

In a further embodiment of the present invention, a system comprising components adapted to implement the method above is provided.

In another embodiment a computer program is provided which realizes the method above when executed on a computer.

Alterations and modifications may be made to the above without departing from the scope of the invention. Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible.

Additionally, it is expressly intended that specific elements and/or method steps described in connection with any disclosed embodiment of the invention may be incorporated in any other embodiment as a general matter of design choice.

For example, similar considerations apply if the computers have different structure or include equivalent units. It is possible to replace the computers with any code execution entity (such as a PDA, a mobile phone, and the like).

Similar considerations apply if the program (which may be used to implement each embodiment of the invention) is structured in a different way, or if additional modules or functions are provided. Likewise, the memory structures may be of other types, or may be replaced with equivalent entities (not necessarily consisting of physical storage media).

Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code).

Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibres, wireless connections, networks, broadcast waves, and the like; for example, the medium may be of the electronic, magnetic, optical, electromagnetic, infrared, or semiconductor type.

In any case, the solution according to the present invention lends itself to be carried out with a hardware structure (for example, integrated in a chip of semiconductor material), or with a combination of software and hardware.

The invention claimed is:

1. A method for simulating an animation effect during the display of a digitally encoded picture, comprising:
   accessing a set of predetermined animation effects;
   identifying, using a processor and a memory, a first selected portion of the picture with a computer implemented main subject identification algorithm, wherein the main subject identification algorithm includes, mapping a picture with a grid having a plurality of adjacent squares, each squares being assigned a density factor, indicative of the amount of information included in the square, predetermining a density upper thresholds and a density lower thresholds, identifying on the picture a first largest possible set of adjacent squares all having a density factor higher than the predetermined upper thresholds and a second largest possible set of adjacent squares all having a density factor less than the predetermined lower thresholds, and selecting as the main subject one of the first and second set;
   centering, using the processor and the memory, the display of the picture on the first selected portion of the picture;
   selecting at least one of the predetermined animation effects; and
   applying to the picture the selected at least one predetermined animation effect.

2. The method of claim 1, wherein the set of predetermined animation effects includes the Ken Burns effect.

3. The method of claim 1, wherein the set of predetermined animation effects includes automatic zoom-in and zoom-out effects.

4. The method of claim 1, wherein the at least one predetermined animation effect includes emphasizing the first selected portion of the picture.

5. The method of claim 1, further comprising:
   selecting a second portion of the picture by means of a computer implemented main subject identification algorithm; and
   moving the center of the image display on the second selected portion of the picture.

6. The method of claim 5, wherein the moving the center of the image display includes:
   de-emphasizing the first selected portion of the picture;
   moving the center of the image display to the second selected portion of the picture; and
   emphasizing the second selected portion of the picture.

7. The method of claim 6, wherein the emphasizing includes applying a zoom-in effect, and wherein the de-emphasizing includes applying a zoom-out effect.

8. The method of claim 1, further including:
   calculating an average density value of the plurality of squares in the picture; and wherein the selecting as the main subject includes:
   selecting as the main subject, between the first and second set, the set having an average density factor value with the absolute greatest difference from the average density value.

9. The method of claim 1, wherein the main subject identification algorithm includes a face detection algorithm or a pattern recognition algorithm.

10. A data processing system for simulating an animation effect during the display of a digitally encoded picture, the data processing system comprising:
    a storage device including a storage medium, wherein the storage device stores computer usable program code; and
    a processor, wherein the processor executes the computer usable program code, and wherein the computer usable program code comprises:
    computer usable code for accessing a set of predetermined animation effects;
    computer usable code for identifying a first selected portion of the picture with a computer implemented main subject identification algorithm, wherein the main subject identification algorithm includes computer usable code for mapping a picture with a grid having a plurality of adjacent squares, each squares being assigned a density factor, indicative of the amount of information included in the square, computer usable code for predetermining a density upper thresholds and a density lower thresholds, computer usable code for identifying on the picture a first largest possible set of adjacent squares all having a density factor higher than the predetermined upper thresholds and a second largest possible set of adjacent squares all having a density factor less than the predetermined lower thresholds, and computer usable code for selecting as the main subject one of the first and second set;
    computer usable code for centering the image display on the first selected portion of the picture;
    computer usable code for selecting at least one of the predetermined animation effects; and
    computer usable code for applying to the picture the selected at least one predetermined animation effect.

11. A computer usable program product comprising a computer usable non-transitory storage medium including computer usable code for simulating an animation effect during the display of a digitally encoded picture, the computer usable code comprising:
    computer usable code for accessing a set of predetermined animation effects;
    computer usable code for identifying a first selected portion of the picture with a computer implemented main subject identification algorithm, wherein the main subject identification algorithm includes computer usable code for mapping a picture with a grid having a plurality of adjacent squares, each squares being assigned a density factor, indicative of the amount of information included in the square, computer usable code for predetermining a density upper thresholds and a density lower thresholds, computer usable code for identifying on the picture a first largest possible set of adjacent squares all having a density factor higher than the predetermined upper thresholds and a second largest possible set of adjacent squares all having a density factor less than the predetermined lower thresholds, and computer usable code for selecting as the main subject one of the first and second set;
    computer usable code for centering the image display on the first selected portion of the picture;
    computer usable code for selecting at least one of the predetermined animation effects; and
    computer usable code for applying to the picture the selected at least one predetermined animation effect.

12. The computer usable program product of claim 11, wherein the set of predetermined animation effects includes the Ken Burns effect.

13. The computer usable program product of claim 11, wherein the set of predetermined animation effects includes automatic zoom-in and zoom-out effects.

14. The computer usable program product of claim 11, wherein the at least one predetermined animation effect includes emphasizing the first selected portion of the picture.

15. The computer usable program product of claim 11, further comprising:
   computer usable code for selecting a second portion of the picture by means of a computer implemented main subject identification algorithm; and
   computer usable code for moving the center of the image display on the second selected portion of the picture.

16. The computer usable program product of claim 15, wherein the moving the center of the image display includes:
   computer usable code for de-emphasizing the first selected portion of the picture;
   computer usable code for moving the center of the image display to the second selected portion of the picture; and
   computer usable code for emphasizing the second selected portion of the picture.

17. The computer usable program product of claim 16, wherein the emphasizing includes applying a zoom-in effect, and wherein the de-emphasizing includes applying a zoom-out effect.

18. The computer usable program product of claim 11, further including:
   computer usable code for calculating an average density value of the plurality of squares in the picture; and
   wherein the selecting as the main subject includes:
   computer usable code for selecting as the main subject, between the first and second set, the set having an average density factor value with the absolute greatest difference from the average density value.

* * * * *